(12) United States Patent  (10) Patent No.: US 8,947,252 B2
Wilson  (45) Date of Patent: Feb. 3, 2015

(54) FIREARMS MANAGEMENT SYSTEM

(76) Inventor: Paul H. Wilson, Stockbridge, GA (US)

(*) Notice: Subject to any disclaimer, the term of this patent is extended or adjusted under 35 U.S.C. 154(b) by 561 days.

(21) Appl. No.: 13/230,801

(22) Filed: Sep. 12, 2011

(65) Prior Publication Data

US 2012/0062388 A1  Mar. 15, 2012

Related U.S. Application Data

(60) Provisional application No. 61/381,941, filed on Sep. 11, 2010.

(51) Int. Cl.
| G08B 21/00 | (2006.01) |
| G08B 1/08 | (2006.01) |
| G06Q 99/00 | (2006.01) |
| G06Q 30/00 | (2012.01) |
| G06F 7/00 | (2006.01) |
| G06Q 10/08 | (2012.01) |

(52) U.S. Cl.
CPC .......... *G06Q 10/0833* (2013.01); *G06Q 30/018* (2013.01)
USPC .............. 340/686.6; 340/539.13; 340/539.23; 705/317; 705/333; 705/26.35; 705/26.41; 707/625

(58) Field of Classification Search
USPC ........................................ 42/1.01; 705/26.25
See application file for complete search history.

(56) References Cited

U.S. PATENT DOCUMENTS

| 7,509,766 B2 | 3/2009 | Vasquez |
| 8,095,427 B1 * | 1/2012 | Buxton ...................... 705/26.25 |
| 2002/0157296 A1 * | 10/2002 | Vivian et al. ................. 42/70.11 |
| 2005/0270140 A1 * | 12/2005 | Oh ............................... 340/5.83 |
| 2006/0041481 A1 * | 2/2006 | Stowe ........................... 705/16 |
| 2008/0000130 A1 * | 1/2008 | Mauch et al. ................ 42/70.11 |
| 2008/0289237 A1 * | 11/2008 | Pikielny ...................... 42/70.11 |
| 2009/0009327 A1 * | 1/2009 | Amidi ....................... 340/568.1 |
| 2010/0085151 A1 * | 4/2010 | Hama et al. .................. 340/5.82 |
| 2011/0153637 A1 * | 6/2011 | Bailey et al. ................. 707/769 |
| 2012/0242816 A1 * | 9/2012 | Cruz ............................. 348/77 |

* cited by examiner

*Primary Examiner* — Jennifer Mehmood
*Assistant Examiner* — Pameshanand Mahase
(74) *Attorney, Agent, or Firm* — Mathew L. Grell; Balser & Grell IP Law, LLC

(57) ABSTRACT

A device, system, and associated methods for the management of firearms for locating, tracking, monitoring, indentifying discharge, and related management tasks are disclosed. In one embodiment, a firearm is disclosed having a processor adapted for storing information and receiving and acting upon command and a location monitor adapted to provide specific geographic location information. The processor and location monitor can be integrally formed in a single electronic device. The firearm also includes a connectivity port and a connectivity cable. The system can also include a monitoring station and a configuration computer. In at least one embodiment, a firearm utilizes a processor and a GPS monitor for locating, tracking, monitoring, indentifying discharge, and related management tasks.

6 Claims, 8 Drawing Sheets

FIREARMS MANAGEMENT SYSTEM

CROSS-REFERENCE TO RELATED APPLICATIONS

To the full extent permitted by law, the present United States Non-provisional Patent Application claims priority to and the full benefit of United States provisional Application entitled "Firearms Management System," having assigned Ser. No. 61/381,941, filed on Sep. 11, 2010, incorporated herein by reference in its entirety.

FIELD OF THE INVENTION

The technology described herein relates generally to the fields of firearms and firearms management systems and methods. More specifically, this technology relates to firearms, systems, and associated methods for the management of firearms for locating, tracking, monitoring, indentifying discharge, and related management tasks.

BACKGROUND OF THE INVENTION

Firearms are known in the background art. Many weapons are known to be used for security (a deterrent value), safety (a defensive value), and recreation (a sport value). However, as is well known, there are inherent limitations with the use of firearms. By way of example, both accidental discharge and malevolent discharge can cause injury. In fact, many accidental or malevolent discharges are fatal. There exists a need to reduce the number and occurrence of both accidental discharge and malevolent discharge in the use of firearms. Ideal solutions will reduce the number and occurrence of both accidental discharge and malevolent discharge, while at the same time, not impacting the deterrent, defensive, and sport values of firearms ownership and use.

Related patents known in the background art include the following: U.S. Pat. No. 7,509,766, issued to Vasquez on Mar. 31, 2009, discloses a weapon use tracking and signaling system, and is incorporated herein in its entirety.

The foregoing patent information reflects the state of the art of which the inventor is aware and is tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides a device, system, and associated methods for the management of firearms for locating, tracking, monitoring, indentifying discharge, and related management tasks.

In one exemplary embodiment, the technology described herein provides a firearm. The firearm includes a processor adapted for storing information and receiving and acting upon commands. The processor is powered by a power source. The power source can be integrally formed with the processor. Additionally, the processor is adapted for receiving and transmitting location based information and navigation information.

The firearm also includes a location monitor adapted to provide specific geographic location information. By way of example, the location monitor can be a GPS (global positioning satellite) system. As such, the firearm can be located precisely utilizing GPS navigation coordinates. The location monitor is powered by the power source.

The processor and location monitor can be integrally formed in a single electronic device. The processor and location monitor can be located within or on a firearm in a multiplicity of locations. The location selected is such that normal operation of the firearm is not impeded. By way of example, the processor and location monitor can be located near the serial number identification strip found on firearms, often on or near the slide in a handgun. Additionally, the processor and location monitor can be disposed within the firearm, such that those capabilities of the firearm are unknown to the casual observer.

The firearm also can include a connectivity port. The connectivity port is utilized to couple the firearm to a management system, computer, or the like. By way of example, the connectivity port can be a USB (universal serial bus) port, well known in the computer arts. The connectivity port can be located within or on a firearm in a multiplicity of locations. The location selected is such that normal operation of the firearm is not impeded. By way of example, a USB port can be embedded within the handgrip base. Alternatively, or in addition to, a wireless port can be used such that the firearm can be wirelessly coupled to the firearms management system, computer, or like device. Thus, the firearm is configured for cabled connectivity, such as through a USB port and USB cable, and untethered connectivity through a wireless port.

The firearm configured in this manner can be a handgun, pistol, revolver, rifle, shotgun, or like weapon. Furthermore, even weapons that do not discharge ammunition can be utilized with the processor and location monitor for locating, tracking, monitoring, and related management tasks. The firearm is configured for communication through a public access network and/or a private access network.

In another exemplary embodiment, the technology described herein provides a firearms management system. The system includes firearms configured with a processor adapted for storing information and receiving and acting upon commands and adapted for receiving and transmitting location based information and navigation information. The system includes firearms configured with a location monitor adapted to provide specific geographic location information. The firearms as configured are capable of receiving and transmitting GPS and other location-based information. The firearms as configured are capable being utilized in triangulation based location techniques.

The system also includes at least one monitoring station. Each monitoring station is equipped to communicate with the processor and location monitor in each firearm in the system.

The system also includes a configuration computer. The configuration computer can be coupled to the firearm for conducting management tasks. The coupling can be in tethered or untethered form.

The system also includes at least one connectivity cable. The connectivity cable is used to couple the firearm to the configuration computer. By way of example, the connectivity cable is a USB cable.

In yet another exemplary embodiment, the technology described herein provides a method for the management of firearms. The method includes utilizing firearms configured with a processor adapted for storing information and receiving and acting upon commands and adapted for receiving and transmitting location based information and navigation information. The method includes utilizing firearms configured with a location monitor adapted to provide specific geographic location information. The firearms as configured are capable of receiving and transmitting GPS and other location-based information. The firearms as configured are capable being utilized in triangulation based location techniques.

The method also includes one or more of the following methods steps for a firearms manufacturer creating an original firearm while installing and licensing a GPS chip monitor:
   Manufacturing a GPS chip monitor;
   Installing the GPS chip monitor into a new firearm;
   Packaging a cable connector;
   Configuring a web-based software; and
   Coupling with an enterprise database.

The method also includes one or more of the following methods steps for a firearms manufacturer creating a retro-fitted (after-market) firearm while installing and licensing a GPS chip monitor:
   Registering and licensing for a consumer;
   Manufacturing a GPS chip monitor;
   Retro-fitting the GPS chip monitor into an existing firearm;
   Packaging a cable connector;
   Configuring a web-based software; and
   Coupling with an enterprise database.

The method also includes one or more of the following methods steps for tracking and monitoring a firearm move event:
   GPS chip monitor signals the web application when weapon is moved less than 95 feet, for example;
   Web application signals monitoring station such as ADT, Brinks, home security, of solely the web application;
   Web application, or home monitoring system notifies owner, for example, by e-mail, text, and/or phone call; and
   Personal audit entry into enterprise database.

The method also includes one or more of the following methods steps for tracking and monitoring a firearm tracking location:
   Notifying the web application when the firearm moves a distance beyond 100 feet, for example;
   Triangulating (or other locating means) firearm location;
   Corresponding by web application of the grid location coordinates to a monitoring authority, such as ADT, Brinks, home security, and/or local law enforcement;
   Monitoring, continuously, the event and inputting data into the enterprise database with an audit log; and
   Auditing.

The method also includes one or more of the following methods steps for firearm import/export and process control and audit:
   Signaling by the GPS chip monitor, the web application with a unique responder ID and origin of location based upon triangulation;
   Matching, by the web based application, the unique ID with the global control number of invoice;
   Validating;
   If a true validation occurs, assigning a unique global identifier to the distributer/supplier, and registering the global identifier for a match;
      Sending a successful match notification back to the manufacturer for certification acknowledgement via the web application; and
      Personalizing the audit entry into the enterprise database;
   If a true validation does not occur, initiating another re-tracking assessment is redone and verifying a retriangulation;
      Notifying by the web application system the manufacturer and ATF via e-mail, text, and/or phone call; and
      Entering the audit entry into the enterprise database.

The method also includes one or more of the following methods steps for a user seeking a firearm:
   Contacting an approved firearm vendor;
   Running a verification check series by an approved vendor on the user and the user's firearm;
   In a first check, verifying user's credentials;
   In a second check, verifying firearms registration authenticity;
   In a third check, verifying user/firearm relationship after $1^{st}$ and $2^{nd}$ checks are completed successfully;
   Assuming all three check are successful, proceeding to register user/firearm as a sequence for the system;
   Recording data in the enterprise data warehouse; and
   Beginning licensing.

The method also includes one or more of the following methods steps subsequent to an unsuccessful first check:
   If user has never been registered, submitting for Brady Law registration; and
   If unable to or illegal to register, denying user, but still registered the firearm.

The method also includes one or more of the following methods steps for subsequent to an unsuccessful second check:
   Checking the weapon for legality;
   If illegal, registering with the ATF and confiscating the weapon; and
   If legal, weapon is registered with the ATF and retrofitting the weapon.

Advantageously, the technology described herein provides a firearm, firearms management system, and method of managing firearms, that all alert the firearm owner that the firearm is moving, without hindering the use of the firearm. Also advantageously, the technology described herein provides for a firearm, firearms management system, and method of managing firearms, that all alert the firearm owner that the firearm has discharged. Further advantageously, the technology described herein provides for these advantages and capabilities to be met with either an originally manufactured firearm equipped as such by the manufacturer, or an existing firearm retro-fitted with these technologies and enhancements by a certified professional. Both implementations provide the same system of recording user and firearm data, tracking, detecting, and alerting.

Still further advantageously, the firearm, firearms management system, and method of managing firearms provides business model and revenue streams for the manufacturers of firearms, and the like. By way of example, the following aspects can be utilized for points at which an event occurs and a revenue stream potential exists: purchase of a firearms management system, licensing of the firearms management system, registration of user/weapon identification, maintenance policy agreement, event packs, unlimited notification package, disposal of weapon, transfer of weapon, re-identification, criminal research access (CSI, police, federal, etc.), court related research (lawyer, judicial), notification of receipt of weapons for suppliers and distributors of weapons, and import/export accountability for suppliers and distributors.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the technology described herein. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a device, system, and associated methods for the management of firearms for locating, tracking, monitoring, indentifying discharge, and related management tasks.

Figure 1:
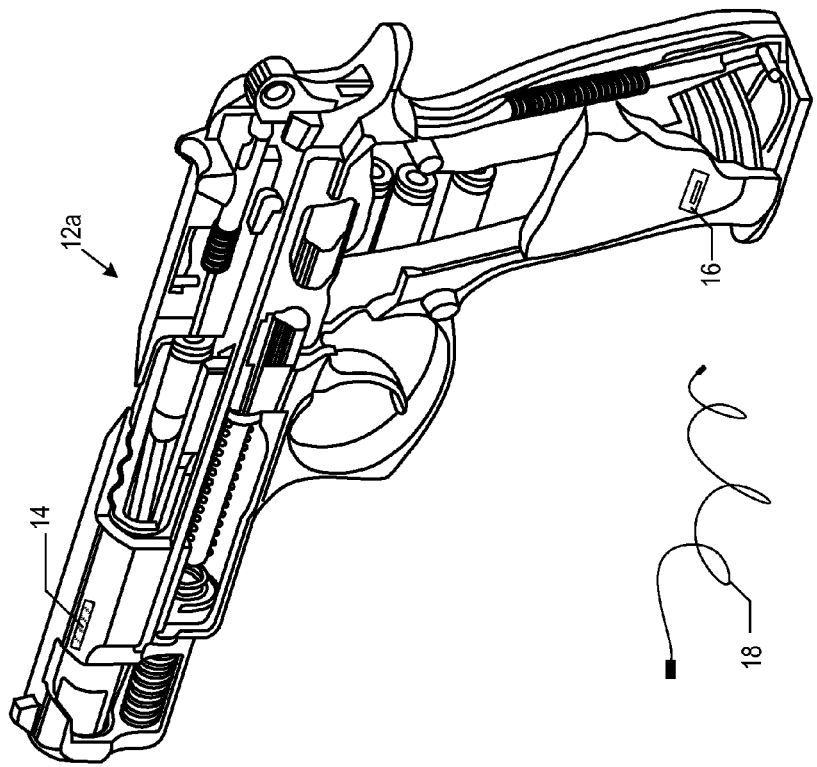
FIG. 1 is a front perspective view of a pistol equipped with a firearms management system, according to an embodiment of the technology described herein.
Figure 1:
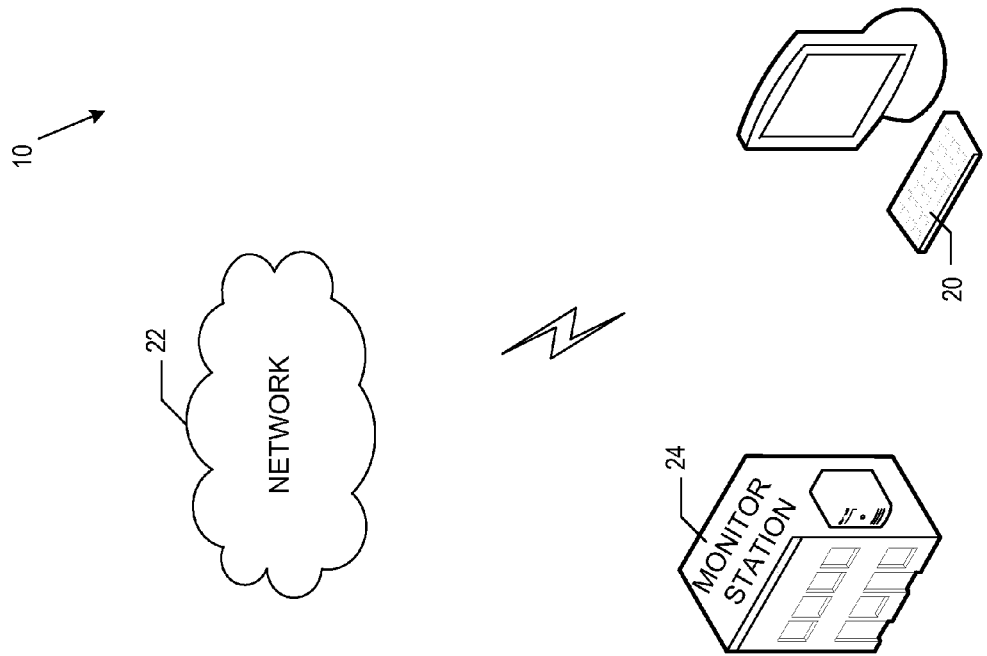
Figure 2:
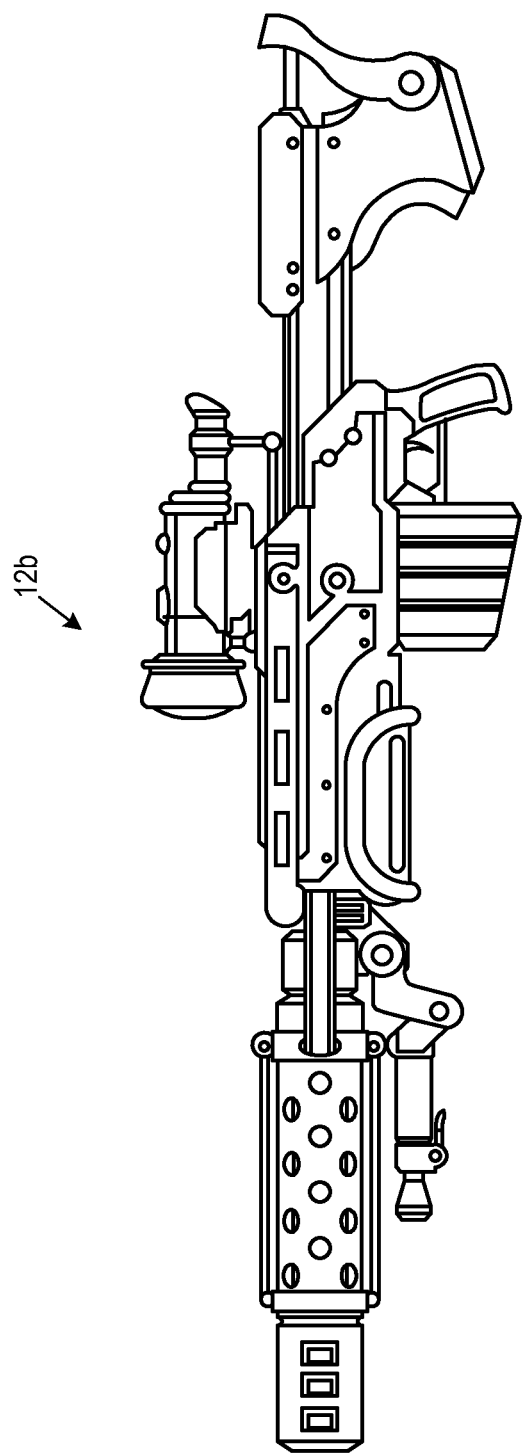
FIG. 2 is a front perspective view of a rifle equipped with a firearms management system, according to an embodiment of the technology described herein.
Figure 3:
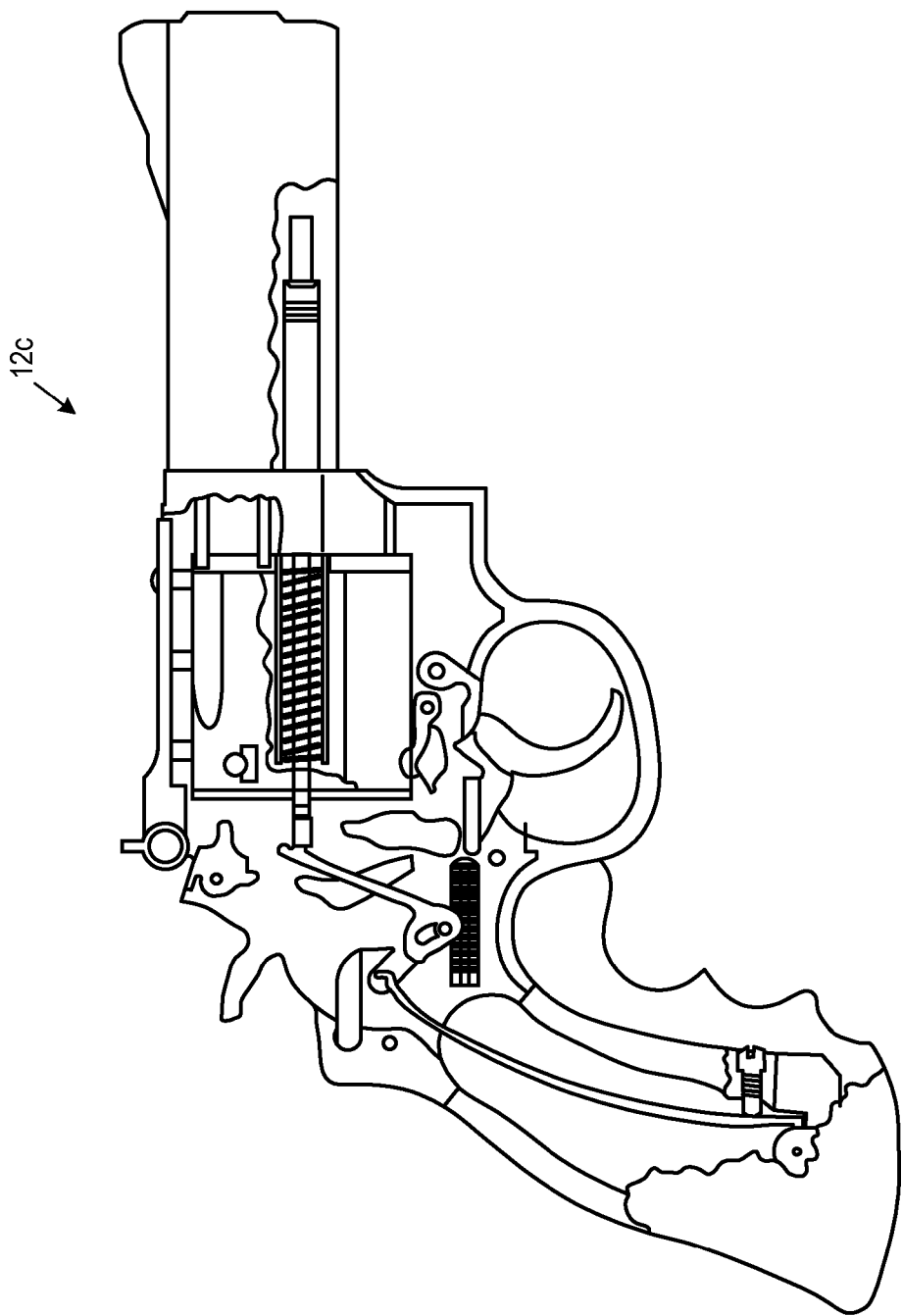
FIG. 3 is a front perspective view of a pistol equipped with a firearms management system, according to an embodiment of the technology described herein.
Figure 4:
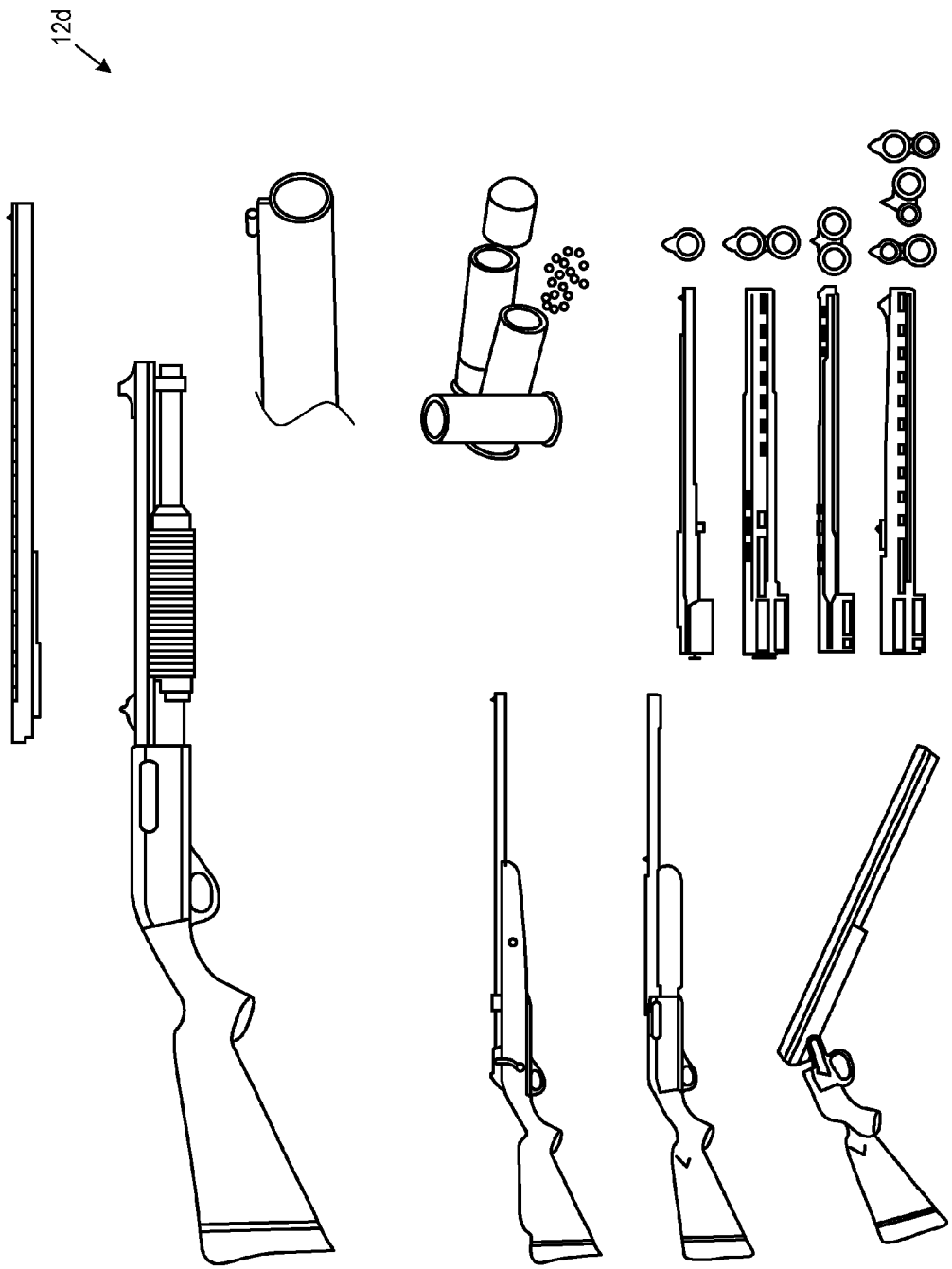
FIG. 4 is a side view of a rifle, having various barrel assemblies, equipped with a firearms management system, according to an embodiment of the technology described herein.

Referring now to FIGS. 1 through 4, a firearm 12 is shown. The technology described herein can be utilized on various weapons and firearms. FIG. 1 illustrates a pistol 12a. FIG. 2 illustrates a rifle, specifically a C10 canister rifle 12b. FIG. 3 illustrates a revolver 12c. FIG. 4 illustrates a rifle 12d and a multiplicity of format and barrel configurations.

The firearm 12 includes a processor 14 adapted for storing information and receiving and acting upon commands. The processor 14 is powered by a power source. The power source can be integrally formed with the processor 14. Additionally, the processor 14 is adapted for receiving and transmitting location based information and navigation information over a network 22.

The firearm 12 also includes a location monitor adapted to provide specific geographic location information. By way of example, the location monitor can be a GPS (global positioning satellite) system. As such, the firearm 12 can be located precisely utilizing GPS navigation coordinates. The location monitor is powered by the power source.

The processor 14 and location monitor can be integrally formed, as depicted in FIG. 1, in a single electronic device. The processor 14 and location monitor can be located within or on a firearm 12 in a multiplicity of locations. The location selected is such that normal operation of the firearm is not impeded. By way of example, the processor 14 and location monitor can be located near the serial number identification strip found on firearms, often on or near the slide in a handgun. Additionally, the processor 14 and location monitor can be disposed within the firearm 12, such that those capabilities of the firearm 12 are unknown to the casual observer.

The firearm 12 also can include a connectivity port 16. The connectivity port 16 is utilized to couple the firearm to a management system, computer, or the like. By way of example, the connectivity port can be a USB (universal serial bus) port, well known in the computer arts. The connectivity port 16 can be located within or on a firearm in a multiplicity of locations. The location selected is such that normal operation of the firearm is not impeded. By way of example, a USB port can be embedded within the handgrip base. Alternatively, or in addition to, a wireless port can be used such that the firearm can be wirelessly coupled to the firearms management system, computer, or like device. Thus, the firearm 12 is configured for cabled connectivity, such as through a USB port and USB cable, and untethered connectivity through a wireless port.

The firearm 12 configured in this manner can be a handgun, pistol, revolver, rifle, shotgun, or like weapon. Furthermore, even weapons that do not discharge ammunition can be utilized with the processor and location monitor for locating, tracking, monitoring, and related management tasks. The firearm 12 is configured for communication through a network 22 such as a public access network and/or a private access network.

In another exemplary embodiment, the technology described herein provides a firearms management system 10, as depicted specifically in FIG. 1. The system 10 includes firearms 12 configured with a processor 14 adapted for storing information and receiving and acting upon commands and adapted for receiving and transmitting location based information and navigation information. The system 10 includes firearms 12 configured with a location monitor adapted to provide specific geographic location information. The firearms 12 as configured are capable of receiving and transmitting GPS and other location-based information. The firearms 12 as configured are capable being utilized in triangulation based location techniques.

The system 10 also includes at least one monitoring station 24. Each monitoring station 24 is equipped to communicate with the processor 14 and location monitor in each firearm 12 in the system 10.

The system 10 also includes a configuration computer 20. The configuration computer 20 can be coupled to the firearm 12 for conducting management tasks. The coupling can be in tethered or untethered form.

The system also includes at least one connectivity cable 18. The connectivity cable 18 is used to couple the firearm 12 to the configuration computer. By way of example, the connectivity cable 18 is a USB cable.

In yet another exemplary embodiment, the technology described herein provides a method 100 for the management of firearms. The method includes utilizing firearms 12 configured with a processor 14 adapted for storing information and receiving and acting upon commands and adapted for receiving and transmitting location based information and navigation information. The method 100 includes utilizing firearms 12 configured with a location monitor adapted to provide specific geographic location information. The firearms 12 as configured are capable of receiving and transmitting GPS and other location-based information. The firearms 12 as configured are capable being utilized in triangulation based location techniques.

Figure 5:
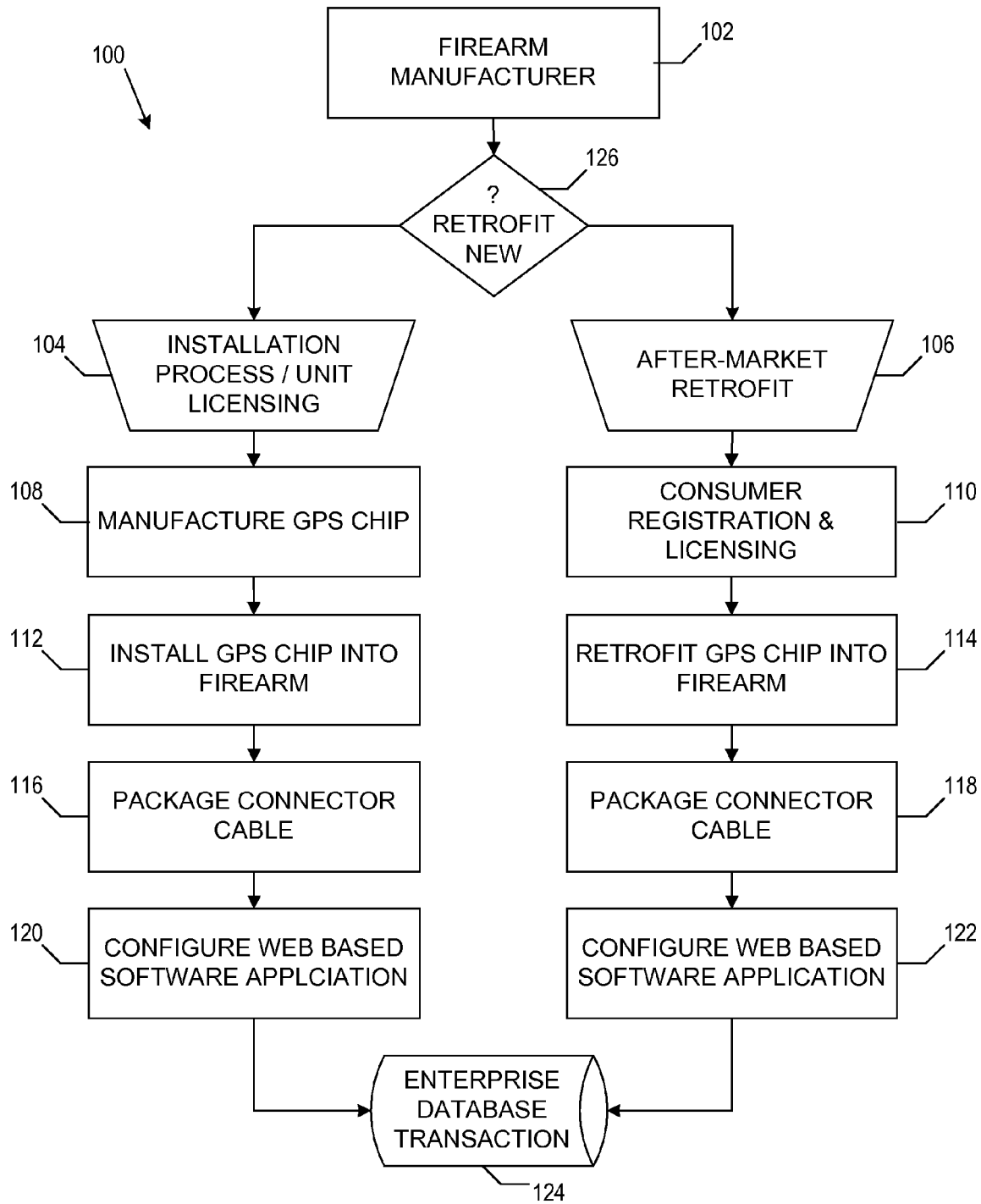
FIG. 5 is a flowchart diagram illustrating manufacturer method steps in a firearms management system, according to an embodiment of the technology described herein.
Figure 6:
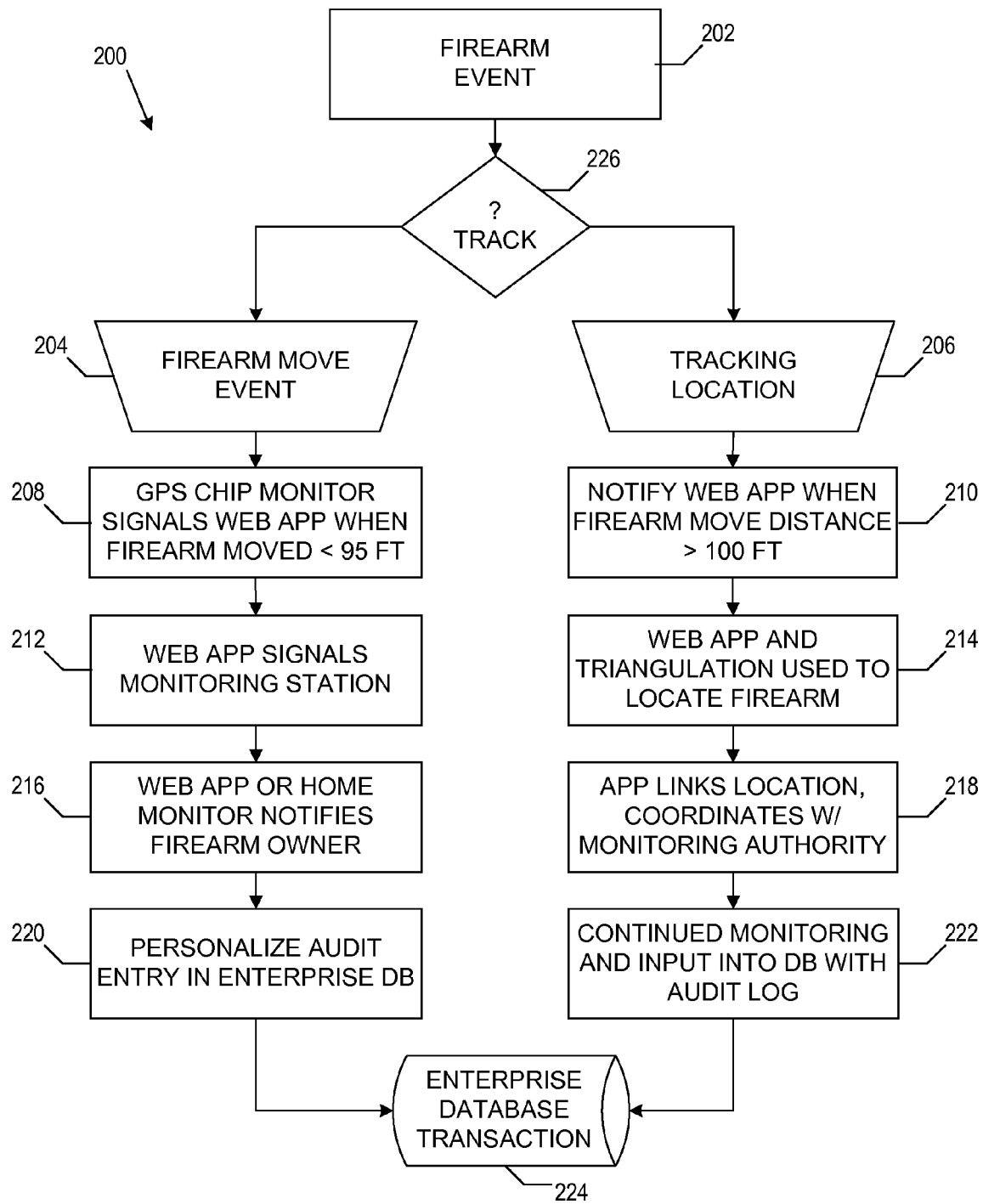
FIG. 6 is a flowchart diagram illustrating a the steps of a firearm event in the firearms management system, according to an embodiment of the technology described herein.
Figure 7:
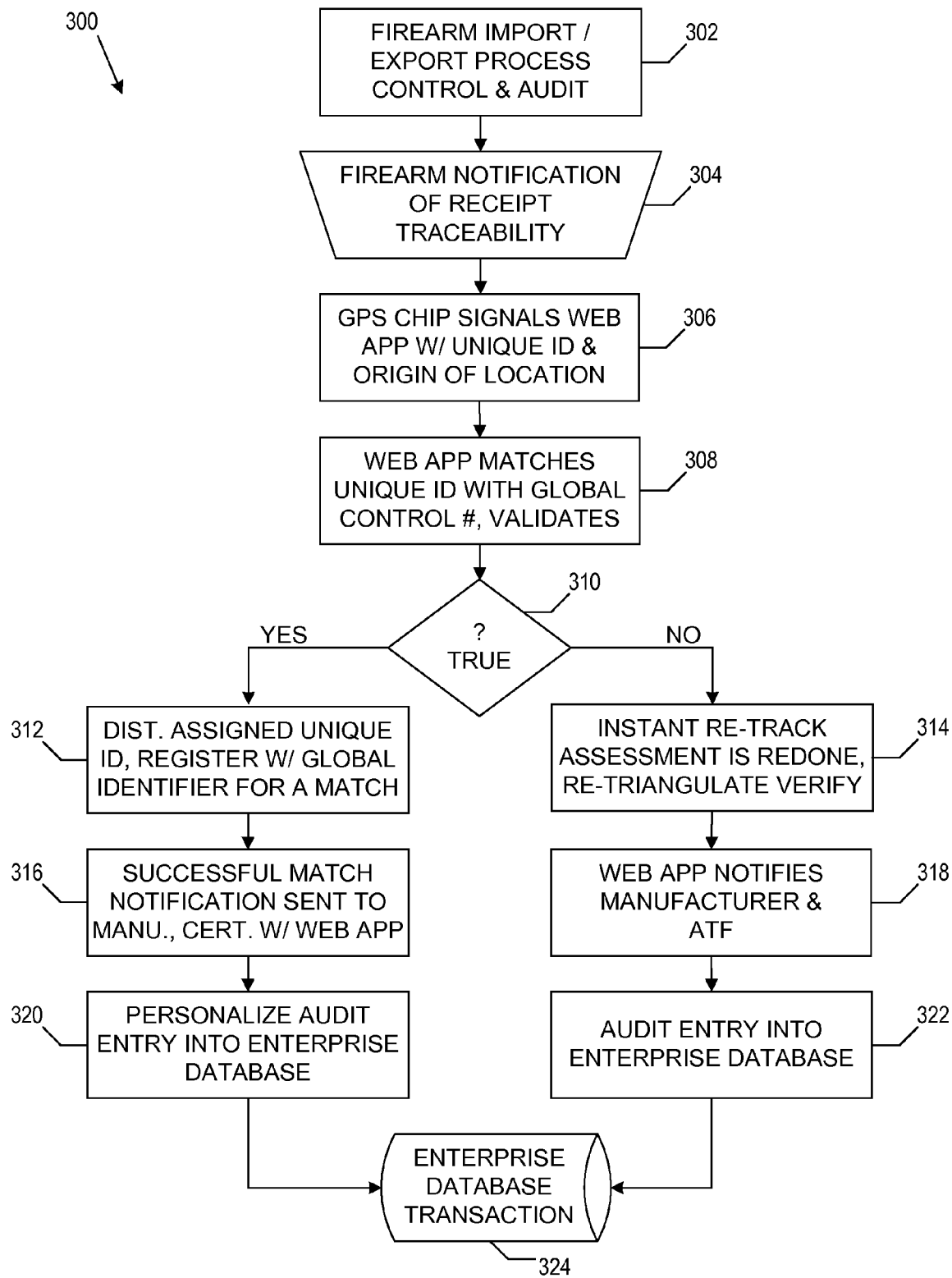
FIG. 7 is a flowchart diagram illustrating the process control and audit steps in the firearms management system, according to an embodiment of the technology described herein.
Figure 8:
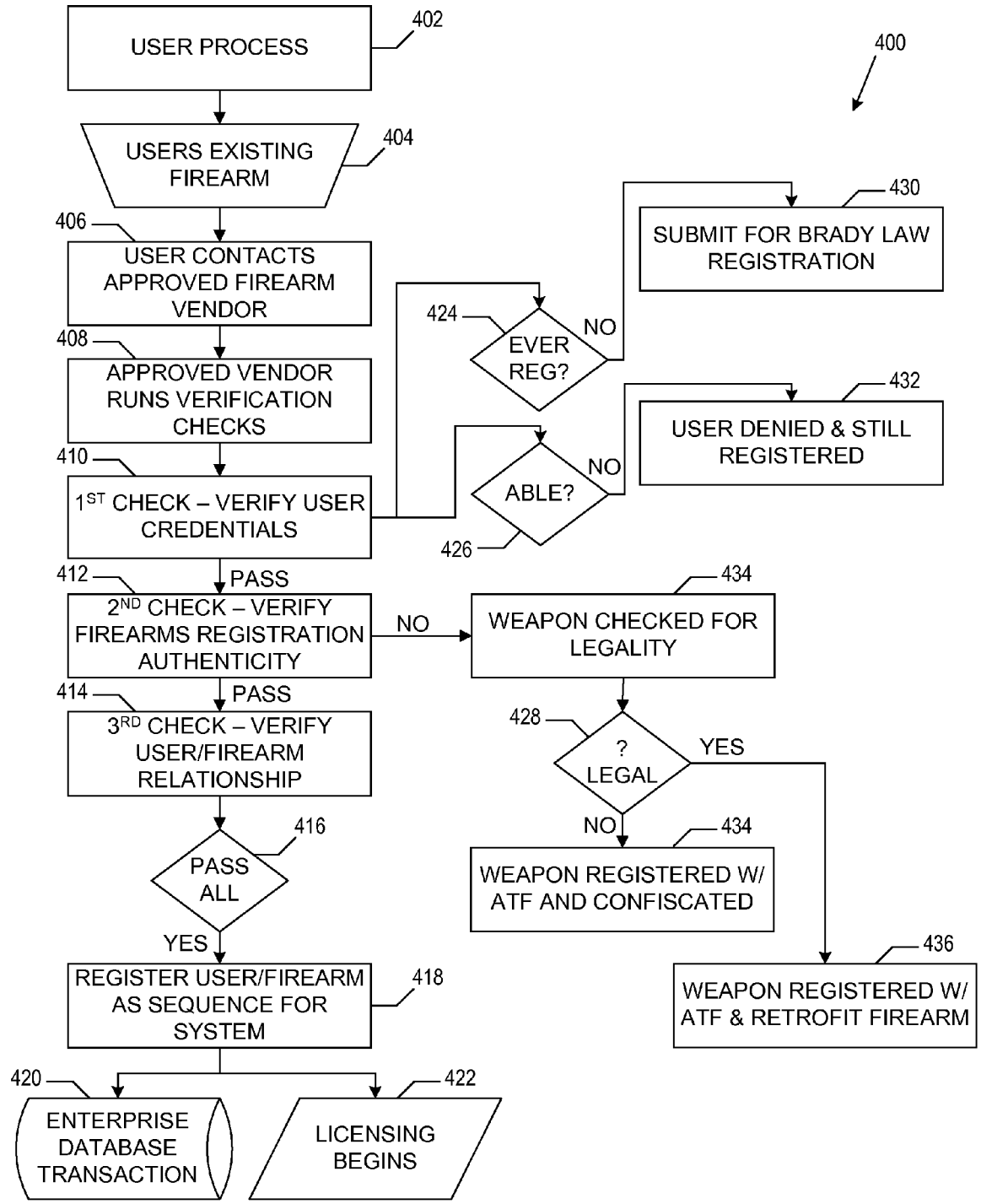
FIG. 8 is a flowchart diagram illustrating user registration process steps in the firearms management system, according to an embodiment of the technology described herein.

As depicted specifically in FIG. 5, the method 100 also includes one or more of the following methods steps for a firearms manufacturer 102 creating an original firearm while installing and licensing a GPS chip monitor, after determining whether a new install 104 or a retrofit 106 in step 126:

Manufacturing a GPS chip monitor, in step 108;
Installing the GPS chip monitor into a new firearm, in step 112;
Packaging a cable connector, in step 116;
Configuring a web-based software, in step 120; and
Coupling with an enterprise database, in step 124.

The method 100 also includes one or more of the following methods steps for a firearms manufacturer creating a retrofitted (after-market) firearm while installing and licensing a GPS chip monitor:

Registering and licensing for a consumer, in step 110;
Manufacturing a GPS chip monitor;
Retro-fitting the GPS chip monitor into an existing firearm, in step 114;
Packaging a cable connector, in step 118;
Configuring a web-based software, in step 122; and
Coupling with an enterprise database, in step 124.

A method 200 also includes one or more of the following methods steps for tracking and monitoring a firearm move event 202 after determining in step 226 whether and how to track the event 202:

When a firearm move event 204;
GPS chip monitor signals the web application when weapon is moved less than 95 feet, for example, in step 208;
Web application signals monitoring station such as ADT, Brinks, home security, of solely the web application, in step 212;
Web application, or home monitoring system notifies owner, for example, by e-mail, text, and/or phone call, in step 216; and
Personal audit entry into enterprise database 224, in step 220.

The method also includes one or more of the following methods steps for tracking and monitoring a firearm move event 202 after determining in step 226 whether and how to track the event 202:

When a tracking location event 206;
Notifying the web application when the firearm moves a distance beyond 100 feet, for example, in step 210;
Triangulating (or other locating means) firearm location, in step 214;
Corresponding by web application of the grid location coordinates to a monitoring authority, such as ADT, Brinks, home security, and/or local law enforcement, in step 218;
Monitoring, continuously, the event and inputting data into the enterprise database with an audit log, in step 222; and
Auditing.

A method 300 also includes one or more of the following methods steps for firearm import/export and process control and audit 302:

Firearm notification or receipt and traceability, in step 304;
Signaling by the GPS chip monitor, the web application with a unique responder ID and origin of location based upon triangulation, in step 306;
Matching, by the web based application, the unique ID with the global control number of invoice, in step 308;
Validating 310;
If a true validation occurs, in step 310, assigning a unique global identifier to the distributer/supplier, and registering the global identifier for a match, in step 312;
Sending a successful match notification back to the manufacturer for certification acknowledgement via the web application, in step 316; and
Personalizing the audit entry into the enterprise database 324, in step 320;
If a true validation does not occur, in step 310, initiating another re-tracking assessment is redone and verifying a retriangulation, in step 314;
Notifying by the web application system the manufacturer and ATF via e-mail, text, and/or phone call, in step 318; and
Entering the audit entry into the enterprise database 324, in step 322.

A method 400 includes one or more of the following methods steps for a user seeking a firearm 402, when a user already has an existing firearm 404:

Contacting an approved firearm vendor, in step 406;
Running a verification check series by an approved vendor on the user and the user's firearm, in step 408;
In a first check, verifying user's credentials, in step 410;
In a second check, verifying firearms registration authenticity, in step 412;
In a third check, verifying user/firearm relationship after $1^{st}$ and $2^{nd}$ checks are completed successfully, in step 414;
Assuming all three check are successful, in step 416, proceeding to register user/firearm as a sequence for the system, in step 418;
Recording data in the enterprise data warehouse, in step 420; and
Beginning licensing, in step 422.

The method 400 also includes one or more of the following methods steps subsequent to an unsuccessful first check, in step 410:

If user has never been registered, in step 424, submitting for Brady Law registration, in step 430; and
If unable to or illegal to register, in step 426, denying user, but still registered the firearm, in step 432.

The method 400 also includes one or more of the following methods steps for subsequent to an unsuccessful second check, in step 412:

Checking the weapon for legality, in step 434;
Determining if legal, in step 428;

If illegal in step 428, registering with the ATF and confiscating the weapon in step 434; and If legal in step 428, weapon is registered with the ATF and retrofitting the weapon in step 436.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology described herein and are intended to be covered by the following claims.

What is claimed is:

1. A method for associating a firearm having an electronic device that can communicate with a user-firearm computer system with a user by an authorized firearm vendor comprising:

providing user identification data to the user-firearm computer system;

providing firearm registration data to the user-firearm computer system;

verifying the user identification data on the user-firearm computer system;

verifying authenticity of the firearm registration data on the user-firearm computer system;

verifying user-firearm relationship between said electronic device and the provided user identification data and firearm registration data on the user-firearm computer system; and registering user-firearm relationship into the user-firearm computer system.

2. The method for associating a firearm having an electronic device connectable to a user-firearm computer system with a user by an authorized firearm vendor of claim 1 wherein said electronic device comprising a processor, location monitor, or combinations thereof.

3. A method for tracking, recording and alerting the movement of a firearm having an electronic device that can communicate with a user-firearm computer system comprising:

determining a position of a registered, location-equipped firearm via the electronic device communicating its position to the user-firearm computer system;

monitoring the position of the registered, location-equipped firearm via the electronic device communicating its position to the user-firearm computer system;

identifying movement of the registered, location-equipped firearm greater than a predetermined distance via the user-firearm computer system;

recording the movement of the registered, location-equipped firearm on the user-firearm computer system;

mapping the movement of the registered, location-equipped firearm on the user-firearm computer system;

alerting at least one entity associated with the registered, location-equipped firearm; and providing a real-time mapped location to the at least one entity associated with the registered, location-equipped firearm.

4. The method for tracking, recording and alerting the movement of a firearm having an electronic device that can communicate with a user-firearm computer system of claim 3 wherein said electronic device comprising a processor, location monitor, or combinations thereof.

5. A method for firearm import/export control and audit of a firearm having an electronic device that can communicate with a user-firearm computer system comprising:

activating notification of receipt traceability for a firearm on the user-firearm computer system;

assigning a unique identification for the firearm on the user-firearm computer system;

determining a current location associated for the firearm via the electronic device communicating its current location to the user-firearm computer system;

matching the unique identification for the firearm with a global control number on the user-firearm computer system;

validating the unique identification and global control number on the user-firearm computer system;

recording a destination for the firearm on the user-firearm computer system;

recording an expected delivery date for the firearm on the user-firearm computer system;

recording the movement of the firearm on the user-firearm computer system;

tracking movement of the firearm via the electronic device communicating its current location to the user-firearm computer system;

mapping the movement of the firearm on the user-firearm computer system;

providing a real-time mapped location to at least one authorized entity;

recording a delivered date for the firearm on the user-firearm computer system;

notifying the at least one authorized entity when the delivered date for the firearm occurs; and alerting the at least one authorized entity when the expected delivery date is more than a predetermined amount in the past without the receipt of a delivered date for the firearm.

6. The method for firearm import/export control and audit of a firearm having an electronic device that can communicate with a user-firearm computer system of claim 5 wherein said electronic device comprising a processor, location monitor, or combinations thereof.

* * * * *